(12) United States Patent
Zhu

(10) Patent No.: US 11,204,527 B2
(45) Date of Patent: Dec. 21, 2021

(54) LIQUID CRYSTAL DISPLAY PANEL, DRIVING METHOD THEREFOR, AND DISPLAY DEVICE

(71) Applicant: BOE TECHNOLOGY GROUP CO., LTD., Beijing (CN)

(72) Inventor: Jinye Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 847 days.

(21) Appl. No.: 15/778,713

(22) PCT Filed: Dec. 7, 2017

(86) PCT No.: PCT/CN2017/114929
§ 371 (c)(1),
(2) Date: May 24, 2018

(87) PCT Pub. No.: WO2018/188361
PCT Pub. Date: Oct. 18, 2018

(65) Prior Publication Data
US 2021/0200040 A1    Jul. 1, 2021

(30) Foreign Application Priority Data
Apr. 10, 2017 (CN) .......................... 201710229279.4

(51) Int. Cl.
*G02F 1/1343* (2006.01)
*G02F 1/29* (2006.01)
(Continued)

(52) U.S. Cl.
CPC ... *G02F 1/134309* (2013.01); *G02B 27/4205* (2013.01); *G02F 1/133504* (2013.01);
(Continued)

(58) Field of Classification Search
CPC . G02F 1/133504; G02F 1/294; G11B 7/1353; G02B 27/4205
See application file for complete search history.

(56) References Cited

U.S. PATENT DOCUMENTS 5,699,135 A * 12/1997 Hisatake ........... G02F 1/133512
349/113
8,891,034 B2 * 11/2014 Takane ................. G11B 7/1369
349/33

(Continued)

FOREIGN PATENT DOCUMENTS

CN    102193202 A    9/2011
CN    104851394 A    8/2015
(Continued)

OTHER PUBLICATIONS

International Search Report and Written Opinion for PCT/CN2017/114929 dated Feb. 24, 2018.
(Continued)

*Primary Examiner* — Edmond C Lau
*Assistant Examiner* — Jonathan Y Jung
(74) *Attorney, Agent, or Firm* — Calfee, Halter & Griswold LLP

(57) ABSTRACT

The present disclosure relates to the field of display technologies, and specifically discloses a liquid crystal display panel, a driving method therefor and a display device. Specifically, the liquid crystal display panel comprises: a first substrate and a second substrate arranged oppositely, as well as a plurality of liquid crystal diffraction units arranged in a same layer between the first substrate and the second substrate. Each liquid crystal diffraction unit comprises: a first electrode, a second electrode comprising at least one strip sub-electrode, as well as liquid crystal sandwiched between the first electrode and the second electrode. Furthermore, each liquid crystal diffraction unit is configured to
(Continued)

change a deflection direction of light passing through each liquid crystal diffraction unit when voltages are applied to the first electrode and the strip sub-electrodes.

14 Claims, 4 Drawing Sheets

(51) Int. Cl.
 G02B 27/42 (2006.01)
 G02F 1/1335 (2006.01)
 G09G 3/36 (2006.01)
 G11B 7/1353 (2012.01)
(52) U.S. Cl.
 CPC ........ *G02F 1/133512* (2013.01); *G02F 1/294* (2021.01); *G09G 3/3696* (2013.01); *G11B 7/1353* (2013.01); *G02F 1/133531* (2021.01)

(56) References Cited

U.S. PATENT DOCUMENTS

| | | | | |
|---|---|---|---|---|
| 2005/0276205 | A1* | 12/2005 | Heor | G11B 7/1353 369/112.02 |
| 2008/0218459 | A1* | 9/2008 | Kim | G02F 1/134309 345/87 |
| 2010/0026920 | A1 | 2/2010 | Kim et al. | |
| 2011/0228181 | A1 | 9/2011 | Jeong et al. | |
| 2014/0055692 | A1* | 2/2014 | Kroll | G02F 1/292 349/15 |
| 2014/0055716 | A1* | 2/2014 | Zhang | G02F 1/133606 349/64 |
| 2016/0357063 | A1* | 12/2016 | Liu | G02B 5/30 |
| 2017/0139243 | A1 | 5/2017 | Ma | |

FOREIGN PATENT DOCUMENTS

| | | |
|---|---|---|
| CN | 106125361 A | 11/2016 |
| CN | 106292124 A | 1/2017 |
| CN | 106802502 A | 6/2017 |

OTHER PUBLICATIONS

First Office Action for Chinese Patent Application No. 201710229279.4 dated Apr. 4, 2018.

* cited by examiner

LIQUID CRYSTAL DISPLAY PANEL, DRIVING METHOD THEREFOR, AND DISPLAY DEVICE

The present application is the U.S. national phase entry of PCT/CN2017/114929 filed on Dec. 7, 2017, which claims the priority of the Chinese patent application No. 201710229279.4 filed on Apr. 10, 2017, the entire disclosures of both are incorporated herein by reference.

TECHNICAL FIELD

The present disclosure relates to the field of display technologies, and specifically discloses a liquid crystal display panel, a driving method therefor, and a display device.

BACKGROUND ART

Typically, in a liquid crystal display panel, two layers of polarizers are required on respective sides of the liquid crystal so as to achieve display of full black, constant bright and different gray scales. However, such an arrangement of double-layered polarizers may often result in greater loss of optical energy.

SUMMARY

The present disclosure provides a liquid crystal display panel, a driving method therefor and a corresponding display device, so as to solve or at least alleviate one or more of the technical problems or defects as mentioned above.

According to one aspect of the present disclosure, a liquid crystal display panel is provided. The liquid crystal display panel comprises: a first substrate and a second substrate arranged oppositely, as well as a plurality of liquid crystal diffraction units arranged in a same layer between the first substrate and the second substrate. Each liquid crystal diffraction unit comprises: a first electrode, a second electrode comprising at least one strip sub-electrode, and liquid crystal sandwiched between the first electrode and the second electrode. Furthermore, each liquid crystal diffraction unit is configured to change a deflection direction of light passing through each liquid crystal diffraction unit when voltages are applied to the first electrode and the strip sub-electrodes.

Optionally, according to an embodiment of the present disclosure, in each liquid crystal diffraction unit of the liquid crystal display panel, the strip sub-electrode comprises a group of first strip sub-electrodes and multiple groups of second strip sub-electrodes arranged symmetrically on respective sides of the group of first strip sub-electrodes. Specifically, the group of first strip sub-electrodes comprises one or more first strip sub-electrodes, and each group of second strip sub-electrodes comprises one or more second strip sub-electrodes. Besides, when voltages are applied, each group of second strip sub-electrodes constitutes an odd zone or an even zone of a sub-zone plate. Further optionally, in a specific embodiment, the first strip sub-electrodes and the second strip sub-electrodes all have a same width.

Optionally, according to an embodiment of the present disclosure, for each liquid crystal diffraction unit in the liquid crystal display panel, the follow equation satisfies: $Aj=\sqrt{jZ1\lambda}$, wherein Z1 is a distance between a plane of the second electrode and a focusing position of light after passing through the liquid crystal diffraction unit; Aj is a distance between a central position of the liquid crystal diffraction unit and a distal-most end of the jth group of second strip sub-electrodes from the central position, wherein j is a positive integer; and λ is a wavelength of light incident on the liquid crystal diffraction unit.

Optionally, according to an embodiment of the present disclosure, in the liquid crystal display panel as mentioned above, the first substrate comprises a color filter substrate, and the second substrate comprises an array substrate. Furthermore, the second electrode is arranged on a side of the array substrate close to the color filter substrate, and the first electrode is arranged on a side of the color filter substrate close to the array substrate.

Optionally, according to an embodiment of the present disclosure, the liquid crystal display panel as mentioned above further comprises: a black matrix, wherein the black matrix is arranged on a side of the color filter substrate away from the array substrate; and a lower polarizer, wherein the lower polarizer is arranged on a side of the array substrate away from the color filter substrate.

Optionally, according to an embodiment of the present disclosure, in the liquid crystal display panel as mentioned above, an orthogonal projection of the group of first strip sub-electrodes on the color filter substrate at least partially overlaps the black matrix.

According to another aspect of the present disclosure, a driving method for the liquid crystal display panel is further provided. Specifically, the driving method comprises: controlling the plurality of liquid crystal diffraction units by changing voltages applied to the second electrode and the first electrode, thereby achieving display of different gray scales.

Optionally, according to an embodiment of the present disclosure, the liquid crystal display panel further comprises a black matrix, wherein the black matrix is arranged on a side of the first substrate away from the second substrate. In this case, light passing through the plurality of liquid crystal diffraction units is blocked by the black matrix such that the liquid crystal display panel is in a full black state.

Optionally, according to an embodiment of the present disclosure, the liquid crystal display panel also further comprises a black matrix, wherein the black matrix is arranged on a side of the first substrate away from the second substrate. In this case, light passing through the plurality of liquid crystal diffraction units are transmitted between adjacent black matrices such that the liquid crystal display panel is in a full bright state. Specifically, the full bright state is achieved by applying a zero voltage to the second electrode and the first electrode. Alternatively, the full bright state is achieved by varying the voltages applied to the second electrode and the first electrode such that light is focused in a position closer to the second electrode as compared to the black matrix after passing through each liquid crystal diffraction unit.

According to yet another aspect of the present disclosure, a display device is further provided. The display device comprises the liquid crystal display panel as described in any of the above embodiments, and a backlight source. Specifically, the backlight source is a collimated backlight source.

DETAILED DESCRIPTION OF EMBODIMENTS

Figure 1:
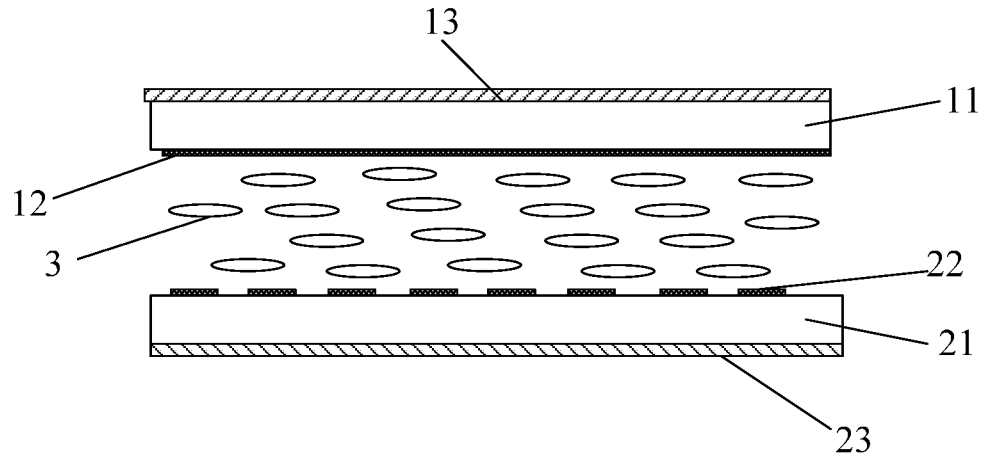
FIG. 1 shows a schematic structure view for a typical liquid crystal display panel.

In order to help those skilled in the art to better understand technical solutions of the present disclosure, the present disclosure will be further described in detail with reference to the drawings and the specific embodiments.

It should be pointed out that in the drawings, various components are indicated by reference signs as follows: 10-first substrate; 11-color filter substrate; 12-first electrode; 13-upper polarizer; 20-second substrate; 21-array substrate; 22-second electrode; 220-first or second strip sub-electrode; 221-group of first strip sub-electrodes; 222-group of second strip sub-electrodes; 23-lower polarizer; 3-liquid crystal; 4-liquid crystal diffraction unit; and 5-black matrix.

Referring to FIG. 1, a schematic structure view for a typical liquid crystal display panel is shown. Specifically, as shown in FIG. 1, the liquid crystal display panel comprises a color filter substrate 11, an array substrate 21, as well as liquid crystal 3 sandwiched between the color filter substrate 11 and the array substrate 21. Besides, in the liquid crystal display panel, an upper polarizer 13 and a lower polarizer 23 are further provided on respective sides of the color filter substrate 11 and the array substrate 21. Specifically, the upper polarizer 13 and the lower polarizer 23 are arranged such that absorption axes thereof are perpendicular to each other. Thereby, when no voltage is applied to the first electrode 12 and the second electrode 22, natural light will become polarized light after passing through the upper polarizer 13 and be absorbed afterwards by the lower polarizer 23. Therefore, the liquid crystal display panel achieves display in a constant black mode. Similarly, if the upper polarizer 13 and the lower polarizer 23 are arranged such that absorption axes thereof are parallel to each other, natural light will also form polarized light after passing through the upper polarizer 13, but still be transmitted through the lower polarizer 23. Therefore, the liquid crystal display panel achieves display in a constant white mode. As can be seen, in conventional solutions for a liquid crystal display panel, typically, two polarizers 13 and 23 are required for achieving display of constant black, constant white for the liquid crystal display panel, or even potentially, display of different gray scales.

Figure 2:
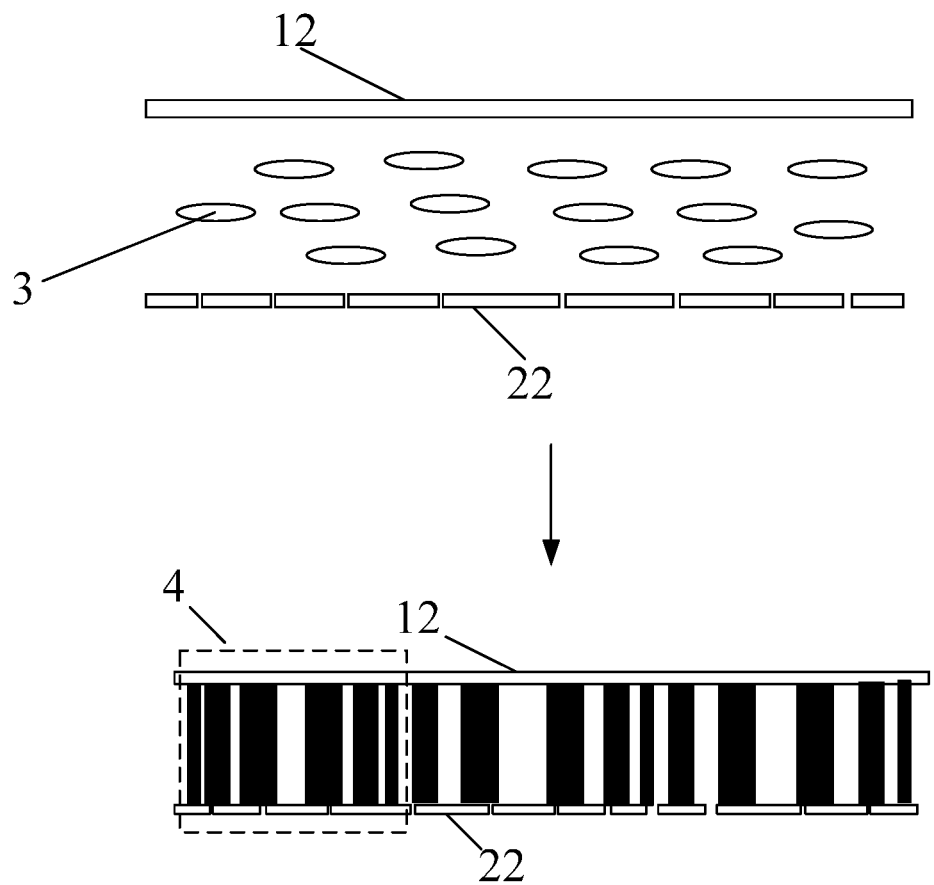
FIG. 2 shows a schematic structure view for a liquid crystal diffraction unit in a liquid crystal display panel according to an embodiment of the present disclosure.

In contrast, according to an embodiment of the present disclosure, a liquid crystal display panel is provided, comprising a plurality of liquid crystal diffraction units. As shown in FIG. 2, each liquid crystal diffraction unit 4 comprises a first electrode 12, a second electrode 22 comprising at least one strip sub-electrode, as well as liquid crystal 3 sandwiched between the first electrode 12 and the second electrode 22. Furthermore, each liquid crystal diffraction unit 4 is further configured to change a deflection direction of light passing through each liquid crystal diffraction unit when voltages are applied to the first electrode 12 and the strip sub-electrodes. This means that each liquid crystal unit 4 forms a sub-zone plate when voltages are applied to the first electrode 12 and the second electrode 22. As shown schematically in FIG. 2, when light impinges on the plurality of liquid crystal diffraction units 4, each liquid crystal diffraction unit 4 forms a sub-zone plate having bright zones and dark zones, i.e., adjacent zones as indicated schematically by black stripes and white stripes respectively in FIG. 2.

In the liquid crystal display panel as provided by an embodiment of the present disclosure, by applying voltages to the second electrode 22 and the first electrode 12, the liquid crystal 3 sandwiched between the second electrode 22 and the first electrode 12 forms a diffraction zone plate. Furthermore, a value of the voltage is changed so as to control a focal distance of the diffraction zone plate (equivalent to an equivalent lens), thereby controlling a deflection direction of light. In this way, when the liquid crystal diffraction zone plate is applied into a display panel, display of different gray scales can be achieved. By means of the liquid crystal diffraction zone plate as provided in the present embodiment, a simpler manufacture process and a higher turnout can be guaranteed for a liquid crystal display panel comprising it and furthermore a display device comprising it. Meanwhile, with the liquid crystal diffraction zone plate, the upper polarizer can be omitted in the final product of display panel. Thereby, most light emitted from the backlight source will be transmitted, which improves the utilization of backlight.

Figure 3:
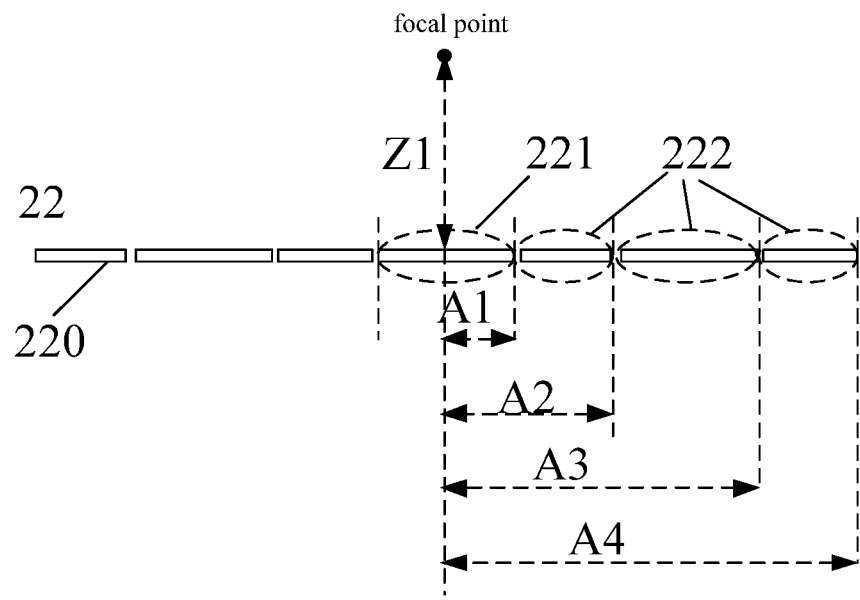
FIG. 3 shows a schematic structure view for a liquid crystal diffraction unit in a liquid crystal display panel according to another embodiment of the present disclosure.

According to an embodiment of the present disclosure, a liquid crystal display panel is provided, comprising: a first substrate 10 and a second substrate 20 arranged oppositely, as well as a plurality of liquid crystal diffraction units 4 arranged in a same layer between the first substrate 10 and the second substrate 20. Furthermore, the plurality of liquid crystal diffraction units 4 are configured to control a deflection direction of light passing through the liquid crystal diffraction units 4. Each liquid crystal diffraction unit 4 comprises a first electrode 12, a second electrode 22 comprising a plurality of strip sub-electrodes, as well as liquid crystal 3 sandwiched between the two electrodes 12 and 22. Furthermore, each liquid crystal diffraction unit 4 is further configured to form a sub-zone plate when voltages are applied to the first electrode 12 and the second electrode 22. As shown in FIG. 3, the second electrode comprises a group of first electrodes 221, and one or more groups of second electrodes 222 arranged symmetrically on respective sides of the group of first electrodes 221. Specifically, in FIG. 3, the group of first electrodes 221 and each group of second electrodes 222 are all formed by individual strip sub-electrodes 220. Assuming that Z1 is a distance between a plane of the second electrode 22 and a focusing position of light after passing through the liquid crystal diffraction unit 4; Aj is a distance between a central position of the liquid crystal diffraction unit 4 and a distal-most end (i.e., the right end in the drawing) of the jth group of second strip sub-electrodes from the central position, wherein j is a positive integer; and λ is a wavelength of light incident on the liquid crystal diffraction unit 4. According to the diffraction principle for a diffraction zone plate, $Aj=\sqrt{jZ1\lambda}$. As an example, when the incident light is green light, λ is 550 nm. In this case, if Z1 is 100 μm, and when j=1, 2, 3, values of Aj are respectively 7.41 μm, 10.49 μm and 12.85 μm. This means that distances between the central position and the right end of each group of second strip sub-electrodes 22 are sequentially 14.82 μm, 3.08 μm and 2.36 μm.

Figure 4:
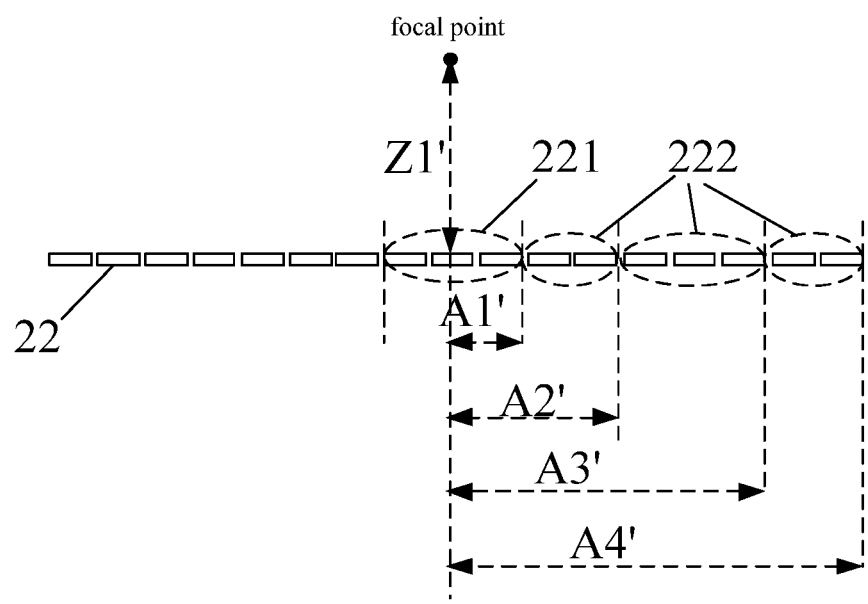
FIG. 4 shows a schematic structure view for a liquid crystal diffraction unit in a liquid crystal display panel according to yet another embodiment of the present disclosure.

Referring to FIG. 4, as an optional example, in each liquid crystal diffraction unit of the liquid crystal display panel, the second electrode also comprises a group of first electrodes 221, and one or more groups of second electrodes 222 arranged symmetrically on respective sides of the group of first electrodes 221. However, in contrast with the case of FIG. 3, now in FIG. 4, the group of first electrodes 221 is formed by three strip sub-electrodes 220, and each group of second electrodes 222 is formed by a different number of strip sub-electrodes 220 respectively, for example, two or three.

It should be pointed out that although the strip sub-electrodes 220 are shown in FIG. 3 and FIG. 4 to have a same width, the present disclosure is not limited thereto. In other words, the strip sub-electrodes 220 can also have different widths. In a similar way, a group of second electrodes 222 comprising two or three strip sub-electrodes 220 is provided only as an example. In fact, each group of second electrodes 222 can comprise any number of strip sub-electrodes 220 upon actual needs.

According to an embodiment of the present disclosure, the liquid crystal display panel controls the deflection direction of light passing through the liquid crystal diffraction unit 4 via a liquid crystal diffraction zone plate, thereby achieving display of different gray scales. Therefore, according to an embodiment of the present disclosure, the upper polarizer can be omitted in the liquid crystal display panel such that most backlight can be transmitted, which improves the utilization of light.

As an optional implementation, in the liquid crystal display panel, the first substrate 10 is a color filter substrate, and the second substrate 20 is an array substrate. Furthermore, the second electrode 22 is arranged on a side of the array substrate close to the color filter substrate, and the first electrode 12 is arranged on a side of the color filter substrate close to the array substrate.

Figure 5:
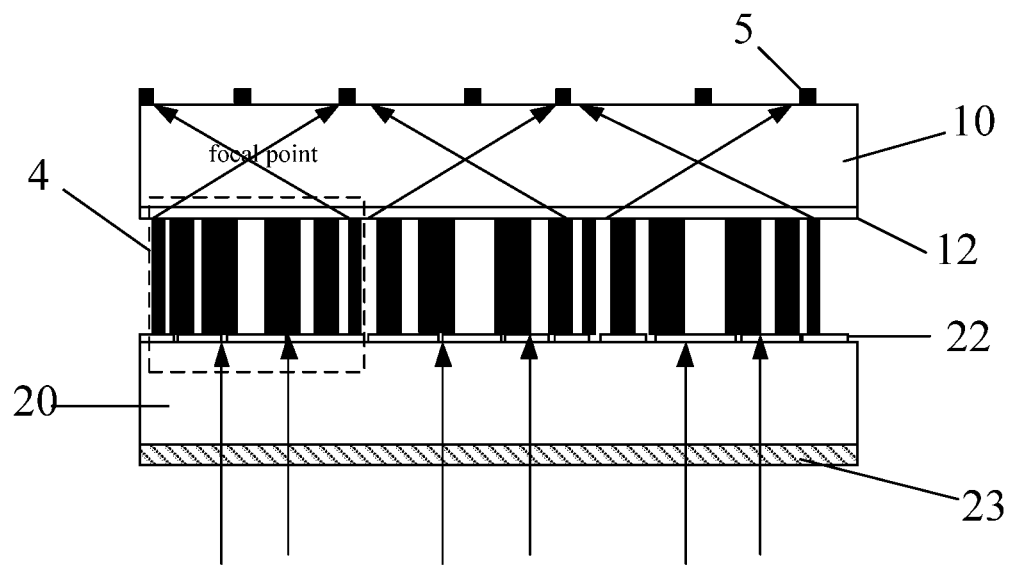
FIGS. 5-8 respectively show schematic structure views for a liquid crystal display panel as configured to achieve a full black state, display of different gray scales, and a full bright state according to an embodiment of the present disclosure.

In other words, referring to FIG. 5, the first substrate 10 located above is a color filter substrate, and the second substrate 20 located below is an array substrate. In this case, the liquid crystal diffraction zone plate is sandwiched between the upper substrate and the lower substrate, and the second electrode 22 comprises a plurality of transparent strip sub-electrodes. When it is necessary to deflect the liquid crystal 3 in a certain position for diffraction, voltages can be applied to corresponding strip electrodes, thereby achieving the effect as shown in FIG. 5.

Optionally, in the liquid crystal display panel as described above, a black matrix is further provided on a side of the color filter substrate away from the array substrate, and a lower polarizer 23 is further provided on a side of the array substrate away from the color filter substrate.

Optionally, light passing through the liquid crystal diffraction zone plate 4 is focused below the black matrix 5, i.e., closer to a plane of the second electrode 22 as compared to the black matrix 5.

Figure 6:
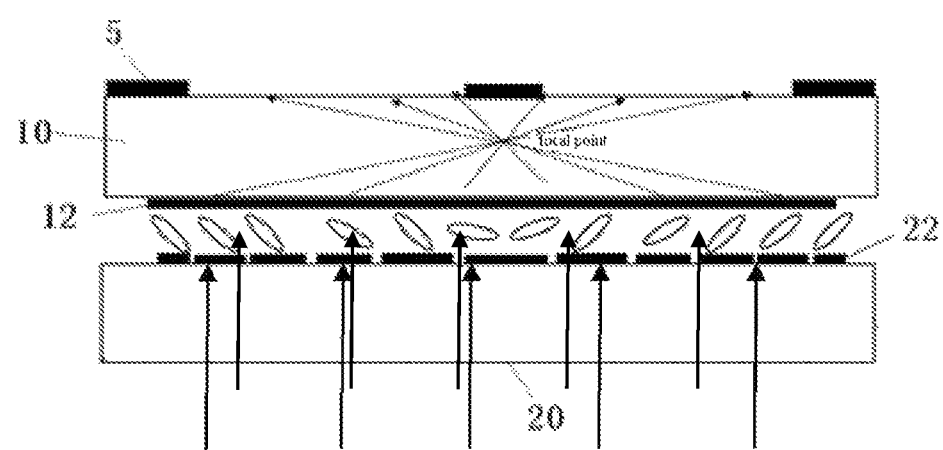

Specifically, FIG. 6 is a schematic view showing light diffraction for a liquid crystal diffraction unit 4, wherein the first electrode 12 is at a low level and configured for forming an electric field with the corresponding second electrode 22. To take the parameters as listed above as an example, when distances between the central position and the first group of second sub-electrodes 221, the second group of second sub-electrodes 221 and the third group of second sub-electrodes 221 are sequentially 14.82 µm, 3.08 µm and 2.36 µm, for incident light with a wavelength of $\lambda=550$ nm, it will be focused in a position of $Z1=100$ µm away from the plane of the second electrode 22 after passing through the liquid crystal diffraction unit 4. In this way, if the black matrix 5 is arranged to be remoter from the plane of the second electrode 22 as compared to the focusing position, i.e., the distance is greater than 100 µm, light passing through the liquid crystal diffraction unit 4 will be emitted out between the black matrices 5 of the first substrate 10 after being focused. In this case, as an example, a voltage of 0-10V is applied to the second sub-electrodes in a corresponding group, such that the liquid crystal 3 is deflected and that light is emitted out at a maximum intensity between the black matrices 5 of the first substrate 10, thereby achieving the brightest state (L255). Alternatively, a full bright state can also be achieved when the liquid crystal is not deflected.

Figure 7:
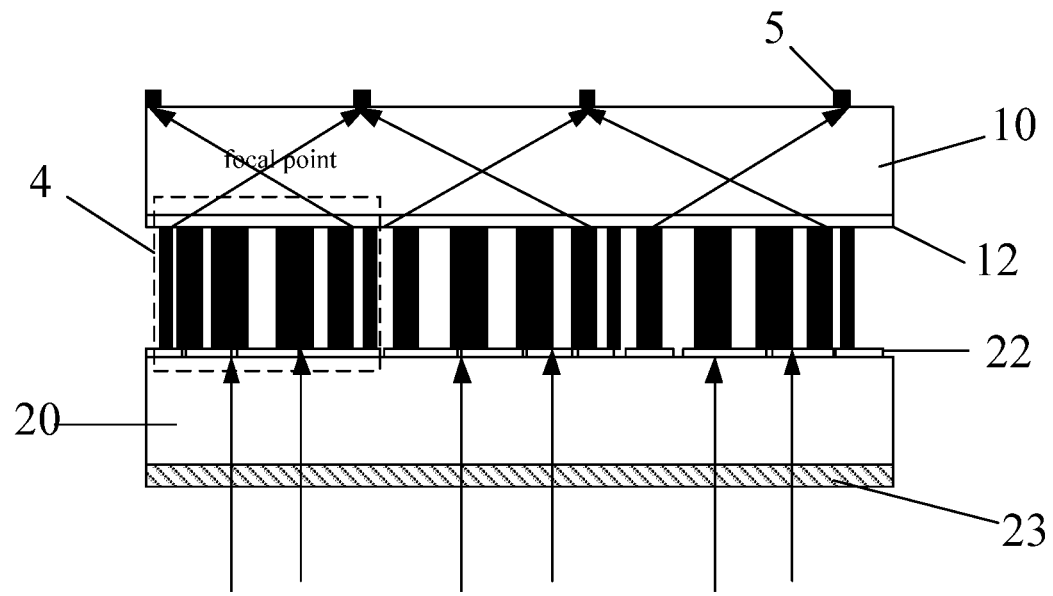

Similarly, a full black display mode of the liquid crystal display panel can be achieved using the following parameters. Specifically, it is assumed that the black matrix 5 is arranged to be 110 µm away from the plane of the second electrode 22. In this case, if light passing through the liquid crystal diffraction zone plate is focused precisely at the black matrix 5, obviously, light will be blocked by the black matrix 5 and thereby a full black display can be achieved. From this perspective of view, when $\lambda=550$ nm, $Z1=110$ µm, and $j=1$, 2, 3, values of Aj are respectively 7.78 µm, 11 µm and 13.47 µm. This means that distances between the central position and the right end of each group of second strip sub-electrodes 22 are sequentially 7.78 µm, 11 µm and 13.47 µm. In this case, by adjusting the voltages applied to the corresponding second sub-electrode, specifically, to be 0-8V, such that light passing through the diffraction zone plate can be focused exactly at the black matrix 5 of the first substrate 10 and is hence blocked by the black matrix 5 of the first substrate 10. In this way, as shown in FIG. 7, a full black display is achieved for the liquid crystal display panel. Similarly, when no voltage is applied to the second electrode 22, all backlight will be transmitted. Therefore, a constant white mode can be achieved as shown in FIG. 7.

It should be noted that according to teachings of the present disclosure and the common knowledge in the art, those skilled in the art should easily understand that by controlling the voltages applied to the first electrode and the second electrode, transmission through the liquid crystal sandwiched therebetween can be varied, and specifically light incident thereon can be reflected back completely. In this way, opaque odd-zones or even-zones as required for the diffraction zone plate can be obtained by control over voltages applied to different second sub-electrodes.

According to another aspect of the present disclosure, a driving method for the liquid crystal display panel is further provided. Specifically, the method comprises: controlling the liquid crystal diffraction zone plate by changing voltages applied to the second electrode 22 and the first electrode 12, thereby achieving display of different gray scales.

Optionally, in a specific embodiment, the black matrix 5 will block light passing through the liquid crystal diffraction zone plate such that the liquid crystal display panel is in a full black state.

In other words, as an example, the voltage on the second electrode can be adjusted to be 0-8V for instance such that light is focused exactly at the black matrix 5 of the first substrate 10 after passing through the diffraction zone plate. Thereby, light will be blocked by the black matrix 5 of the first substrate 10, and thereby a full black display is achieved as shown in FIG. 7.

Figure 8:
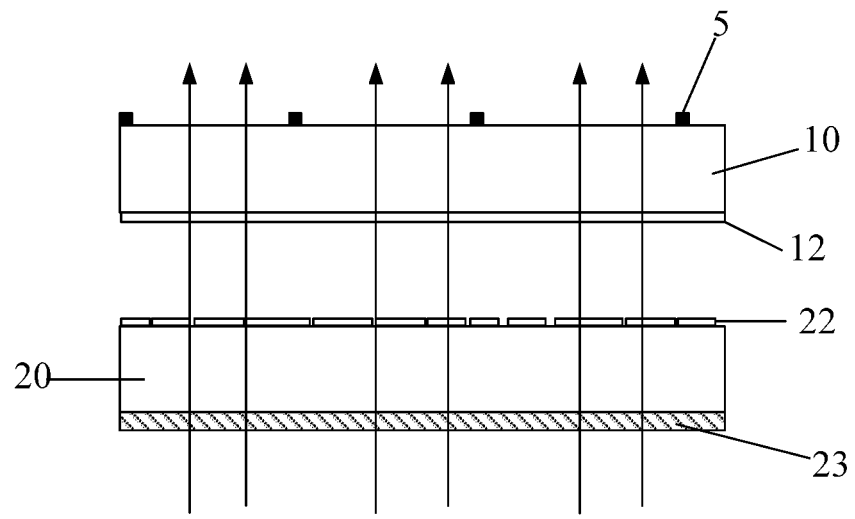

Optionally, in another embodiment, light passing through the liquid crystal diffraction zone plate are transmitted between adjacent black matrices 5, and thus the liquid crystal display panel is in a full bright state, specifically as shown in FIG. 5 or 8.

In other words, as an example, a voltage of 0-10V can be applied to a corresponding second electrode 22 to deflect the liquid crystal 3. In this case, collimated backlight is incident from the lower polarizer, and is capable of passing through the liquid crystal 3. This means that light passing through the liquid crystal diffraction zone plate has a greater divergence angle, and thus diffraction occurs. Specifically, light is transmitted between the black matrices 5 of the first substrate 10 after being focused, thereby achieving the brightest state of display (L255).

Obviously, the above embodiments can be varied in many different ways. For example, different technical parameters for the liquid crystal diffraction zone plate of the display panel can be selected upon needs. Moreover, the size or dimension for the diffraction slits of different liquid crystal diffraction zone plates (i.e., the number of corresponding second sub-electrodes) can be selected upon actual situations.

According to yet another aspect of the present disclosure, a display device is further provided, comprising the above liquid crystal display panel and a backlight source, wherein the backlight source is a collimated backlight source.

As an example, the backlight source can further be a laser.

According to still another aspect of the present disclosure, a display device is further provided, comprising any liquid crystal display panel as mentioned above. As an example, the display device can be any product or component having a display function, such as but not limited to a liquid crystal display panel, electronic paper, a cellphone, a tablet computer, a television, a display, a notebook computer, a digital photo frame, a navigator and the like.

It can be understood that the above embodiments are only exemplary embodiments adopted for illustrating the principle of the present disclosure, but the present disclosure is not limited thereto. For a person having ordinary skills in the art, various variations and improvements can be made without deviating from the spirit and essence of the present disclosure, and these variations and improvements are also considered to fall within the protection scope of the present disclosure.

The invention claimed is:

1. A liquid crystal display panel, comprising:
a first substrate and a second substrate arranged oppositely, and
a plurality of liquid crystal diffraction units arranged in a same layer between the first substrate and the second substrate, each liquid crystal diffraction unit comprising:
a first electrode,
a second electrode comprising at least one strip sub-electrode, and
liquid crystal sandwiched between the first electrode and the second electrode, wherein
each liquid crystal diffraction unit is configured to change a deflection direction of light passing through each liquid crystal diffraction unit in case that voltages are applied to the first electrode and the second electrode,
wherein for each liquid crystal diffraction unit, the following satisfies:
$A_j = \sqrt{jZ1\lambda}$,
wherein Z1 is a distance between a plane of the second electrode and a focusing position of light after passing through the liquid crystal diffraction unit; $A_j$ is a distance between a central position of the liquid crystal diffraction unit and a distal-most end of the jth group of second strip sub-electrodes from the central position, wherein j is a positive integer; and $\lambda$ is a wavelength of light incident on the liquid crystal diffraction unit.

2. The liquid crystal display panel according to claim 1, wherein in each liquid crystal diffraction unit,
the strip sub-electrode comprises a group of first strip sub-electrodes and multiple groups of second strip sub-electrodes arranged symmetrically on respective sides of the group of the first strip sub-electrodes, wherein the group of the first strip sub-electrodes comprises one or more first strip sub-electrodes, and each group of the second strip sub-electrodes comprises one or more second strip sub-electrodes, and
upon application of a voltage, each group of the second strip sub-electrodes constitutes an odd zone or an even zone of a zone plate.

3. The liquid crystal display panel according to claim 2, wherein the first strip sub-electrodes and the second strip sub-electrodes all have a same width.

4. The liquid crystal display panel according to claim 1, further comprising:
a black matrix, arranged on a side of the first substrate away from the second substrate; and
a lower polarizer, arranged on a side of the second substrate away from the first substrate.

5. The liquid crystal display panel according to claim 4, wherein
the first substrate comprises a color filter substrate,
the second substrate comprises an array substrate,
the second electrode is arranged on a side of the array substrate close to the color filter substrate, and
the first electrode is arranged on a side of the color filter substrate close to the array substrate.

6. The liquid crystal display panel according to claim 5, wherein
an orthogonal projection of the group of the first strip sub-electrodes on the color filter substrate at least partially overlaps the black matrix.

7. A driving method for a liquid crystal display panel, the liquid crystal display panel comprising:
a first substrate and a second substrate arranged oppositely, and
a plurality of liquid crystal diffraction units arranged in a same layer between the first substrate and the second substrate, each liquid crystal diffraction unit comprising:
a first electrode,
a second electrode comprising at least one strip sub-electrode and,
liquid crystal sandwiched between the first electrode and the second electrode, wherein
each liquid crystal diffraction unit is configured to change a deflection direction of light passing through each liquid crystal diffraction unit in case voltages area applied to the first electrode and the second electrode,
wherein the driving method comprises: controlling the plurality of the liquid crystal diffraction units by changing voltages applied to the second electrode and the first electrode, thereby achieving display of different gray scales,
wherein the liquid crystal display panel further comprises a black matrix arranged on a side of the first substrate away from the second substrate;
wherein light passing through the plurality of the liquid crystal diffraction units are transmitted between adjacent black matrices such that the liquid crystal display panel is in a full bright state, and wherein the full bright state is achieved by applying a zero voltage to the second electrode and the first electrode, wherein for each liquid crystal diffraction unit, the following equation satisfies:

$$A_j = \sqrt{jZ1\lambda},$$

wherein Z1 is a distance between a plane of the second electrode and a focusing position of light after passing through the liquid crystal diffraction unit; $A_j$ is a distance between a central position of the liquid crystal diffraction unit and a distal-most end of the jth group of second strip sub-electrodes from the central position, wherein j is a positive integer; and λ is a wavelength of light incident on the liquid crystal diffraction unit.

8. The driving method according to claim 7, wherein the liquid crystal display panel further comprises a black matrix arranged on a side of the first substrate away from the second substrate, and light passing through the plurality of the liquid crystal diffraction units is blocked by the black matrix such that the liquid crystal display panel is in a full black state.

9. A display device, comprising:
the liquid crystal display panel according to claim 1, and a collimated backlight source.

10. The display device according to claim 9, wherein in each liquid crystal diffraction unit,
the strip sub-electrode comprises a group of first strip sub-electrodes and multiple groups of second strip sub-electrodes arranged symmetrically on respective sides of the group of first strip sub-electrodes, wherein the group of the first strip sub-electrodes comprises one or more first strip sub-electrodes, and each group of the second strip sub-electrodes comprises one or more second strip sub-electrodes, and upon application of a voltage, each group of the second strip sub-electrodes constitutes an odd zone or an even zone of a zone plate.

11. The display device according to claim 10, wherein the first strip sub-electrodes and the second strip sub-electrodes all have a same width.

12. The display device according to claim 9, the liquid crystal display panel further comprising:
a black matrix arranged on a side of the first substrate away from the second substrate; and
a lower polarizer arranged on a side of the second substrate away from the first substrate.

13. The display device according to claim 12, wherein
the first substrate comprises a color filter substrate,
the second substrate comprises an array substrate,
the second electrode is arranged on a side of the array substrate close to the color filter substrate, and
the first electrode is arranged on a side of the color filter substrate close to the array substrate.

14. The display device according to claim 13, wherein
an orthogonal projection of the group of the first strip sub-electrodes on the color filter substrate at least partially overlaps the black matrix.

* * * * *